United States Patent [19]

Ramshaw et al.

[11] Patent Number: 5,009,085
[45] Date of Patent: Apr. 23, 1991

[54] HEAT PUMPS

[75] Inventors: Colin Ramshaw, Kingsley; Terence Winnington, Stroud, both of United Kingdom

[73] Assignees: Imperial Chemical Industries plc, London; Caradon Mira Ltd., Cheltenham, both of England

[21] Appl. No.: 302,348

[22] Filed: Jan. 27, 1989

[30] Foreign Application Priority Data

Feb. 2, 1988 [GB] United Kingdom ............... 8802152

[51] Int. Cl.$^5$ .................................... F25B 15/00
[52] U.S. Cl. ..................................... 62/476; 62/499
[58] Field of Search ......................... 62/476, 499

[56] References Cited

U.S. PATENT DOCUMENTS

| | | | |
|---|---|---|---|
| 2,979,921 | 4/1961 | Sampietro | 62/499 X |
| 3,605,436 | 9/1971 | Gammill, Jr. | 62/476 |
| 3,740,966 | 6/1973 | Pravda | 62/476 |
| 3,863,454 | 2/1975 | Doerner | 60/669 |
| 4,022,032 | 5/1977 | Nott | 62/499 |
| 4,144,721 | 3/1979 | Kantor | 62/499 X |
| 4,442,677 | 4/1984 | Kauffman | 62/476 X |
| 4,553,408 | 11/1985 | Cross et al. | 62/476 |
| 4,744,224 | 5/1988 | Erickson | 62/476 X |
| 4,793,154 | 12/1988 | Cross et al. | 62/499 |

FOREIGN PATENT DOCUMENTS

| | | |
|---|---|---|
| 0208427 | 6/1986 | European Pat. Off. . |
| 1404431 | 2/1973 | United Kingdom . |
| 1530492 | 3/1976 | United Kingdom . |
| 2104637 | 8/1981 | United Kingdom . |

OTHER PUBLICATIONS

Smith et al., "The Alakali Metal Hydroxide/Water Absorption Heat Pump", Int. Heat Pump Conference, Bristol, U.K., Sept. 1984, pp. 2.8-1 to 2.8-7.

Primary Examiner—Lloyd L. King
Attorney, Agent, or Firm—Cushman, Darby & Cushman

[57] ABSTRACT

An absorption-cycle heat pump comprises a rotary assembly including a vapor generator (GE,14), a condenser (CO,23), an absorber (AB,22), an evaporator (EV) and a solution heat exchanger (X,16). The vapor generator, the condenser and the absorber each include a wall (14, 23, 22 respectively) across which the volatile component (preferably water) and/or a liquid absorbent therefore are caused to flow under the action of the forces generated during rotation of the assembly. The evaporator comprises a plurality of finned heat exchange tubes 31 into which the volatile component is injected with a radially inwardly-directed component of motion, the tubes being of generally elliptical configuration disposed with their major axes extending generally radially. To maintain the evaporator heat exchange surfaces continuously wetted, excess volatile component is supplied such that a major part of the latter remains unvaporised after flow across the evaporator heat exchange surfaces and is collected in a reservoir (26), which also receives the condensate from the condenser, for re-injection into the evaporator tubes (31).

30 Claims, 8 Drawing Sheets

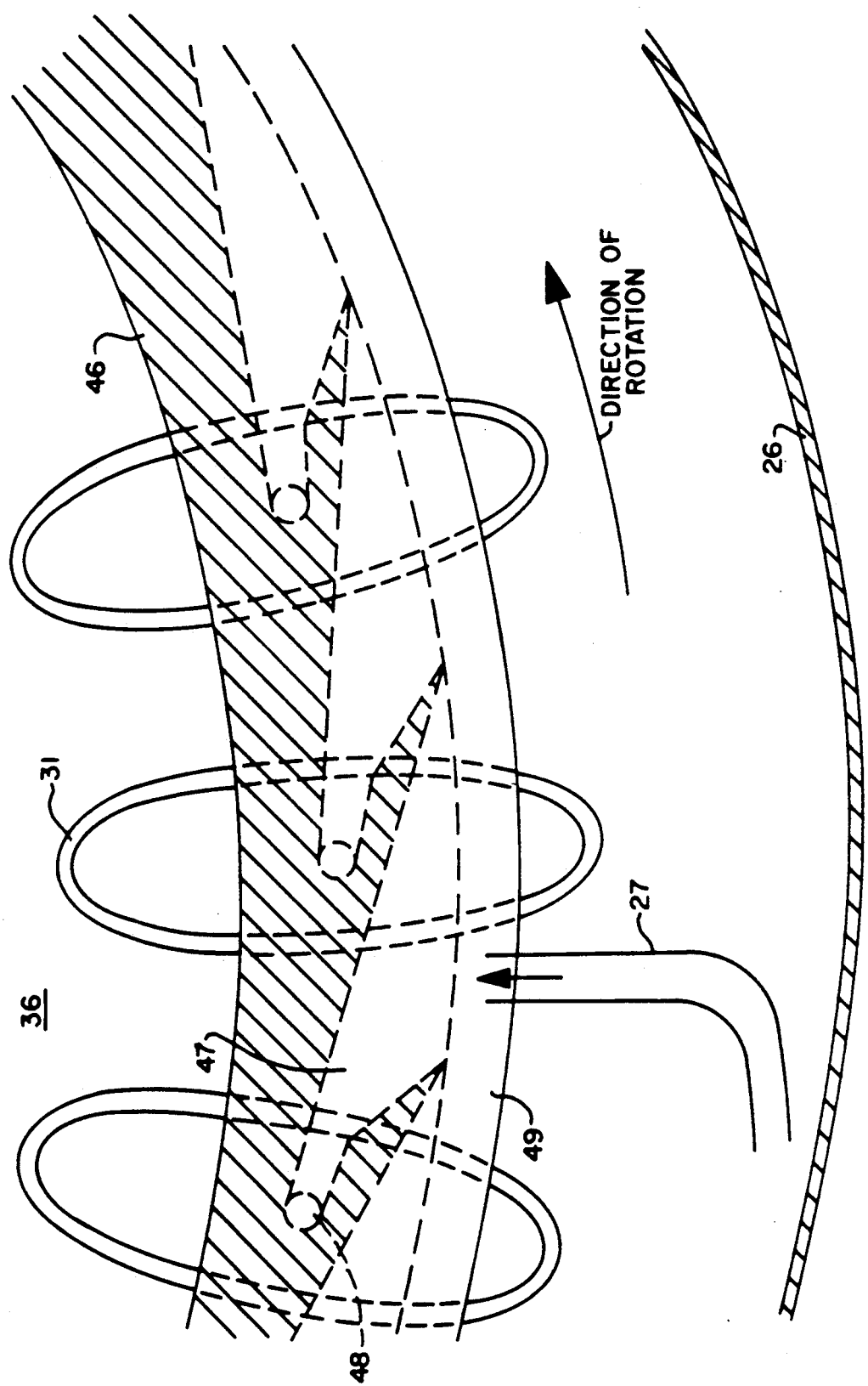

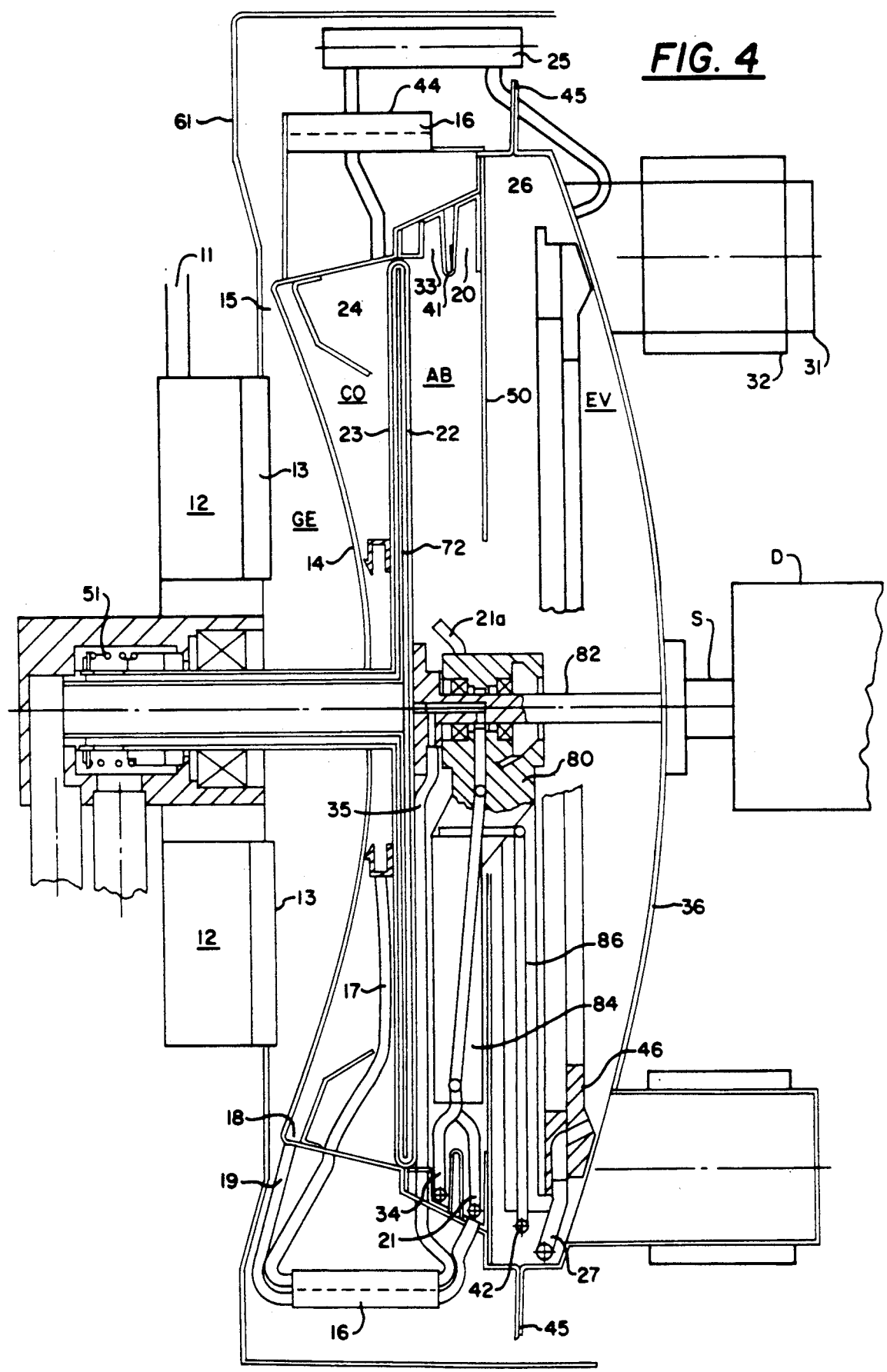

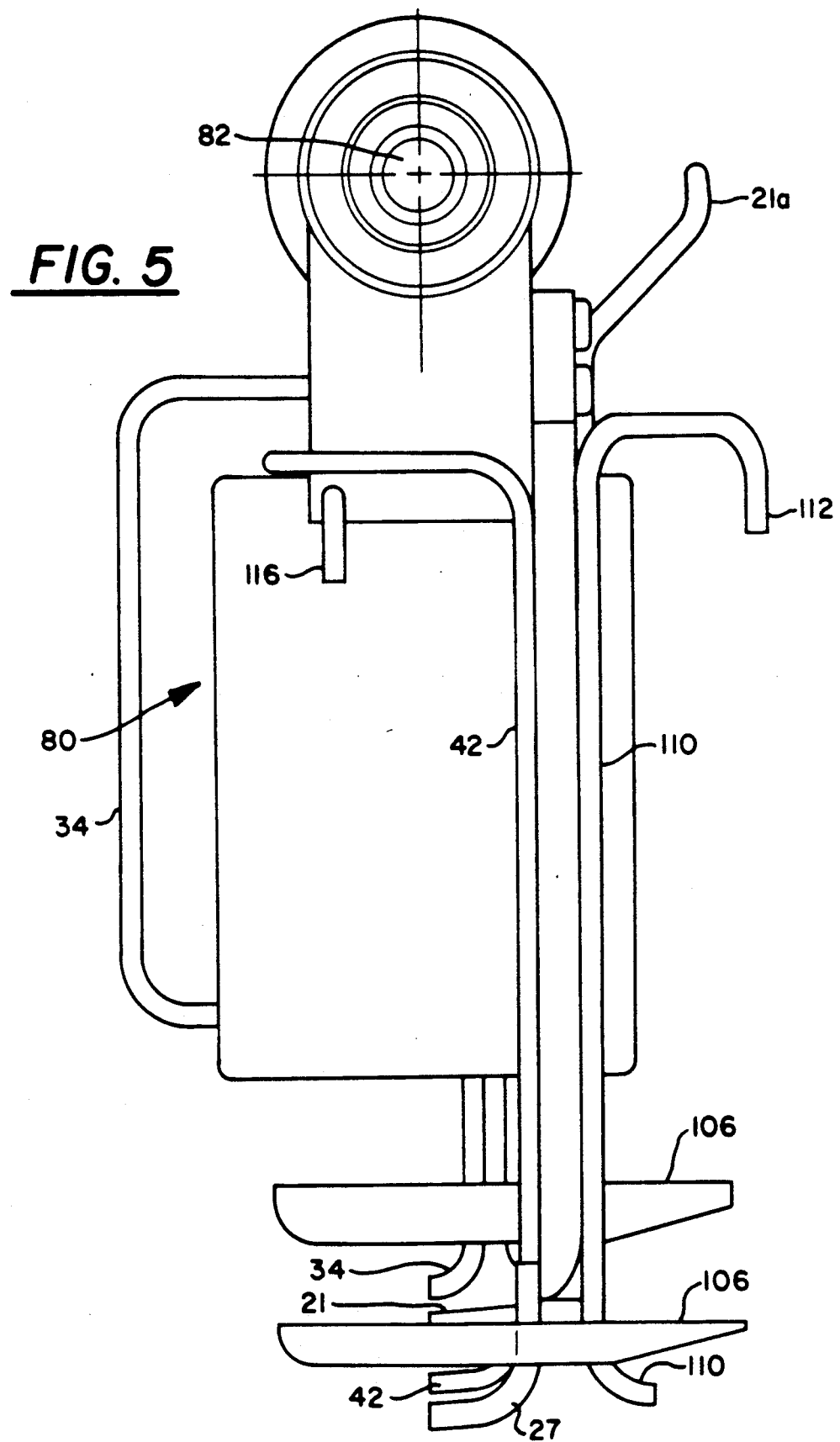

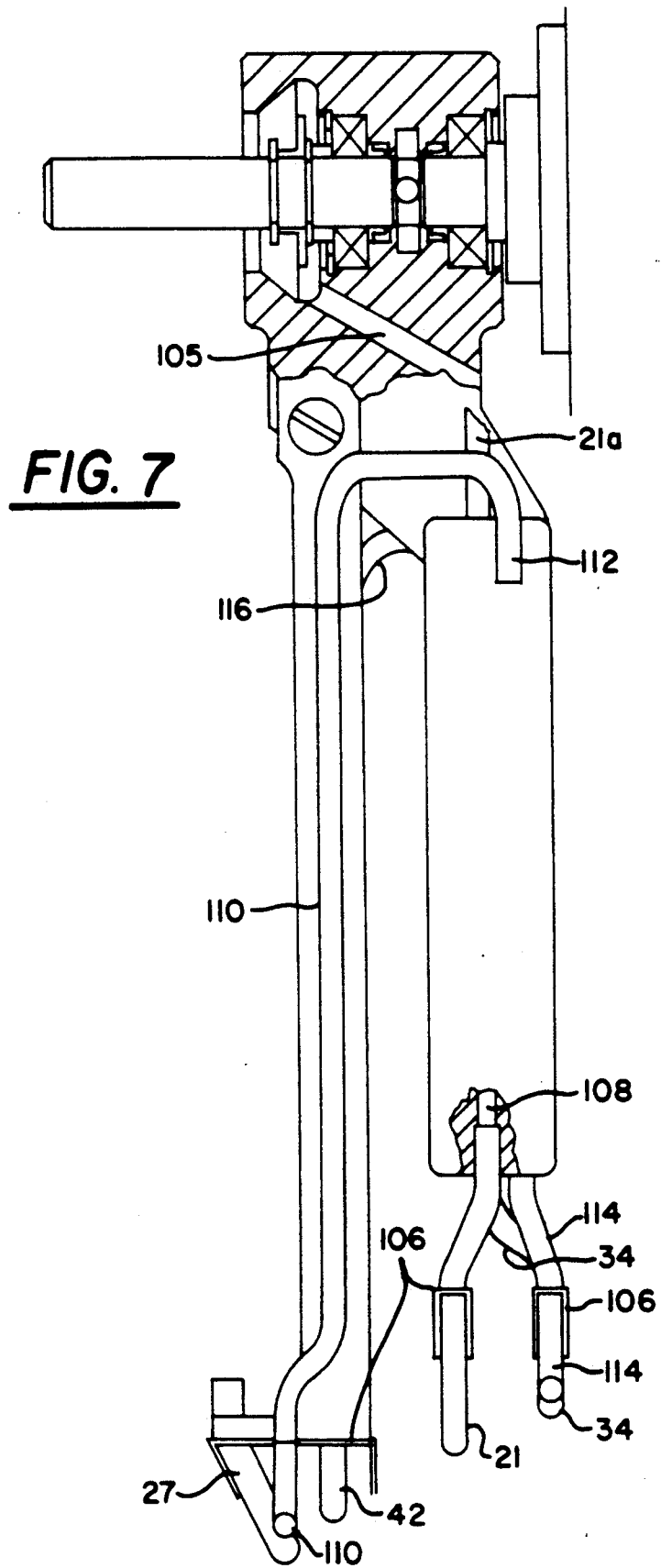

HEAT PUMPS

This invention relates to heat pumps of the absorption cycle type, particularly to such heat pumps of a centrifugal design.

Absorption cycle heat pumps comprise the following components: evaporator, absorber, generator, condenser and optionally a solution heat-exchanger; and are charged with a suitable working mixture in the fluid phase. The working mixture comprises a volatile component and an absorbent therefor.

In absorption cycle heat pumps, a high temperature source of heat, so-called high-grade heat, and a low temperature source of heat, so-called low grade-heat, deliver heat to the heat pump, which then delivers (or ejects) the sum of the heat input from both sources at an intermediate temperature.

In operation of conventional absorption cycle heat pumps, a working mixture which is rich in a volatile component (which mixture is hereinafter referred to for convenience as "Mixture R") is heated in the generator, under pressure, by high-grade heat such that vapor of the volatile component is generated and a working mixture which is less rich or lean in the volatile component is produced (which mixture is hereinafter referred to for convenience as "Mixture L").

In known heat pumps the aforesaid vapor of the volatile component from the generator is condensed in the condenser, at the same high pressure, with the evolution of heat and the formation of liquid volatile component. The liquid volatile component is passed through an expansion valve, to reduce the pressure thereof, and thence to an evaporator. In the evaporator, the aforesaid liquid accepts heat from a low temperature source of heat, typically air or water at ambient temperature, and evaporates. The resulting vapor of the volatile component passes to an absorber where it is absorbed in Mixture L with the re-formation of Mixture R and evolution of heat. The Mixture R is then transferred to the vapor generator and hence completes the cycle.

Where we wish to emphasize the physical state of the volatile component we shall, for convenience, hereinafter refer to it as "VVC" (where it is in the vapor or gas state) or "LVC" (where it is in the liquid state).

Various problems are associated with existing heat pump designs and the present invention, in its various aspects, seeks to provide solutions to problems such as those described below.

Thus, for example, one problem area is that of avoiding dry spots as the volatile component flows over the heat exchange surface of the evaporator. In for example the heat pump disclosed in our prior European Patent Application No. 119776B the evaporator is supplied with condensed volatile component derived from the condenser and, because the amount of condensed volatile component received from the condenser is relatively small, (e.g. 2 gm/sec), the spreading of this small quantity so as to fully wet the relatively large (rotating) evaporator heat exchange surface area is not easily accomplished.

Another problem area arises when water is used as the volatile component. It has been suggested (Smith and Carey, Int. Heat Pump Conference, Bristol, U.K., Sept 1984) that in an absorption cycle heat pump the use of water as the volatile component of the working mixture would lead to a very high theoretical performance, e.g. 70° C. temperature lifts (i.e. from the low temperature source to the delivery temperature). However, where an absorption cycle heat pump employing water as the volatile component of such a working mixture is being operated at low temperature and therefore low pressure, e.g. about 0° C. at the evaporator, large volumes of vapor have to be transferred from the evaporator to the absorber with minimal loss of pressure.

The tube providing vapor flow means between the evaporator and the absorber in conventional absorption cycle heat-pumps tends to be long and of narrow diameter, and thus imposes unacceptable restrictions on such transfer of large volumes of vapor. Such restrictions make it difficult to operate the evaporator economically, particularly at low temperature, say about 0° C., where the vapor pressure and density are low, with high heat loads.

In our European Patent Specification No 0,119,776B (U.S. Pat. No. 4,553,408), the disclosure in which is incorporated herein by way of reference, there is described a form of absorption cycle heat pump which is of a centrifugal design. In the embodiment illustrated therein (at FIGS. 3, 4 and 5), the functions of evaporator and absorber are combined in one unit comprising a plurality of discs (identified therein as 14, 15, 16, and 17) and a plurality of such units are used. Furthermore, it is disclosed that VVC from the generator passes through an array of condenser discs (31) on the faces of which it is condensed. However, manufacture of an absorption cycle heat pump comprising such a plurality and/or array tends to be complicated, and expensive.

Another area where improvements are desirable is in the feed of the volatile component and/or absorbent between the various regions of the heat pump, for instance between the low pressure zone on the evaporator/absorber side of the pump and the high pressure zone at vapor generator/condenser side. In EP-A-119776 for example a sun and planetary gear-type pump is disclosed which adds to the complexity of the design and hence the cost of production.

Other areas where improvements are desirable include: the type of heat source used for the vapor generator and the manner in which the heat produced is utilized; compactness of the heat pump; fluid flow management within the heat pump; and simplification of the arrangements employed for effecting heat transfer between the condenser, the absorber and an external heat exchange fluid, e.g. The water used in a domestic heating system.

According to a first aspect of the invention there is provided an absorption-cycle heat pump comprising a rotary assembly including a vapor generator, a condenser, an evaporator and an absorber so interconnected as to provide cyclic fluid flow paths for a volatile fluid component and an absorbent liquid therefor, a reservoir being provided for receiving from the condenser volatile fluid component condensed thereby in use, and means being provided for directing said component from the reservoir to heat exchange surface means of the evaporator so that said volatile component flows across the heat exchange surface means in a generally radially outward direction, the reservoir receiving from the heat exchange surface means of the evaporator such volatile component as remains unvaporized flowing radially outward flow across said heat exchange surface means whereby part of the volatile component fed to said heat exchange surface means from the reservoir is recirculated back to the reservoir by-passing the condenser.

Thus, with a heat pump according to this aspect of the invention, it is possible to ensure that the evaporator heat exchange surface means is fully wetted during operation because the surface means is, in addition to being supplied with condensed volatile component from the condenser, supplied with volatile component directly from the reservoir so that the quantity of volatile component flowing across the heat exchange surface means may be far in excess of that which is circulated via the absorber/vapor generator/condenser circuit. In practice, the rate of supply of volatile component to the evaporator may be such that only a minor proportion is evaporated, the remaining unevaporated major proportion being returned to the reservoir for recirculation back to the evaporator.

Further aspects and features of the invention are set out in the appended claims and the following general description.

In preferred embodiments of invention the rotary assembly comprises the following components through which a working mixture flows sequentially:

Component A: a vapor generator chargeable with Mixture R and capable of accepting heat at a first temperature such that a portion of the volatile component in Mixture R is vaporized;

Component B: a condenser chargeable with VVC from Component A and separately a heat-accepting fluid such that VVC is condensed to LVC;

Components C: an evaporator chargeable with LVC from component B and capable of accepting heat at a second temperature such that evaporation of LVC occurs therefrom; and Component D: an absorber chargeable with (i) VVC from Component C and Mixture L from Component A in which it is absorbed and (ii) a heat-accepting fluid which takes up the heat of absorption;

at least one of Components A, B and D, and preferably at least both B and D, comprise a substantially disc-or plate-shaped member which is rotatable about an axis which is transverse to the plane thereof and substantially co-axial therewith and through the thickness of which shaped member a heat transfer takes place from a first fluid flowing on a first face of the member to a second fluid flowing on the second face of the member;

The evaporator may comprise:

(a) a plurality of tubes disposed substantially parallel to the axis of rotation;

(b) the inner face of each of the tubes is chargeable with LVC and the outer face thereof is capable of accepting the heat at a second temperature such that evaporation of at least a portion of the LVC occurs from the inner surface of the tubes.

It will be appreciated that the aforesaid first temperature (in the vapor generator) is higher than the aforesaid second temperature (in the evaporator).

Preferably the aforesaid heat at a first temperature is obtained from a hot gas, e.g. from combustion of a fossil fuel, i.e. high grade heat; although we do not exclude the possibility that it may be obtained from a liquid at a suitable temperature, e.g. water from a geothermal source.

Preferably the heat at a second temperature used in Component C is obtained from a gas and more preferably is air at ambient temperature (i.e. low grade heat) although we do not exclude the possibility that it may be a liquid, e.g. water in a river or lake or a liquid stream from an air-conditioning system. Where the heat pump is used in an air-conditioning system and where the low-grade heat is a liquid it is often preferred that both the liquid and the LVC are applied to the evaporator adjacent the axis.

The heat-accepting fluid used in the heat pump according to the present invention preferably flows sequentially through the Components D and B. However, we do not exclude the possibility that separate suppliers of heat-accepting fluid may be used in Components B and D, although this is not preferred.

Typically, the heat pump according to the present invention is used to raise the temperature of the heat-accepting fluids such that it may act as a heat supply, e.g. in a central heating system. Alternatively, the heat pump according to the present invention may be used as a component of an air-conditioning system.

Where the heat pump according to the present invention is used to supply heat the heat-accepting fluid is preferably a liquid, more preferably water. Typically, the aforesaid fluid is used in a central heating system, e.g. a domestic central heating system. However, we do not exclude the possibility that the heat accepting fluid may be a gas.

The volatile component is a fluid which can exist in the vapor or liquid phase under appropriate conditions in the heat pump of the present invention. For example, at 0° C. it typically has a vapor pressure of about 4.5 mm of mercury.

Preferably, the volatile component is a low molecular weight hydroxy compound, e.g. methanol, or more preferably water. However, we do not exclude the possibility that volatile components which are known in the field of conventional absorption cycle heat pumps may be used in the heat pump according to the present invention.

As examples of such known volatile components may be mentioned chlorofluorohydrocarbons well known as refrigerants, for example Refrigerant 124, which is monochlorotetrafluoroethane.

The volatile component is used in combination with a suitable absorbent therefor, which preferably is a compound or composition of good thermal stability and therefore able to survive with little or no difficulty the temperature cycles which repeated use for this purpose entails, at least for the useful life of the heat pump. As examples of suitable absorbents may be mentioned inter alia tetraglyme, i.e. 2,5,8,11,14-pentaoxapentadecane. Where the volatile component is water it is often preferred that the absorbent is an inorganic medium, e.g. containing LiBr, sodium hydroxide, or concentrated $H_2SO_4$. Preferably the absorbent is an absorbent as described in our published European Patent Specification No 0,208,427A the disclosure in which is incorporated herein by way of reference.

In our European Patent Specification No 0,208,427A, there is described an absorption cycle heat pump in which Mixture R comprises a mixture of caesium hydroxide, potassium hydroxide, sodium hydroxide and water in the ratios defined therein. The use of such a mixture often allows heat pumps charged therewith to be used for winter heating in temperate climates.

However, we do not exclude the possibility that the absorbent for water may be a suitable non-volatile organic medium bearing one or more suitable polar groups.

Working mixtures of the aforesaid preferred absorbents and water have a combination of acceptably low freezing points, and acceptably low vapor pressure, e.g.

less than 3 mm of mercury at a temperature of the order of 65° C.

Preferably a fossil fuel is burnt in stationary radiant burners such that at least a substantial portion of the heat generated thereby is radiated directly from the plaques thereof to one face of the disc or plate in the vapor generator. However, we do not exclude the possibility that burning fossil fuel may provide the high-grade heat by alternative means, e.g. substantially all the heat content thereof may be donated to the generator by convection via the flue gas.

Excess heat in the flue gas may be transferred (a) to the generator by suitable means, e.g. by highly sheared flow of the flue gas over the perimeter of the generator; and/or (b) to the solution heat-exchanger as hereinafter described through suitable fins disposed thereon and/or (c) to an annular fin suitably disposed on the outer wall of the rotor adjacent the region where unvaporized LVC collects in the evaporator. The aforesaid highly sheared flow of the flue gas can be created by restricting the width of the passage through which the flue gas flows as it leaves the generator. Provision of such fins on the heat-exchanger enables heat to enter the thermal cycle at a temperature lower than that in the vapor generator and hence improves the thermal performance of the heat pump. Provision of such an annular fin often allows water vapor in the flue gas to be condensed thereon, thus recovering the latent heat of vaporization therefrom.

Furthermore, the finned extension can be arranged such that it behaves as a fan to extract the flue gases from the combustion area tending to remove the requirement for a discrete fan or flue. This has the further advantage of reducing the amount of heat needing to be extracted from the low-grade heat source, thus allowing (i) the number and/or size and/or length of the tubes on the evaporator (and consequently the number of fins thereon) and (ii) the amount of low grade heat-containing fluid needing to be passed over the fins (and consequently the energy expended in doing so) to be reduced.

The tubes of Component C are preferably of non-circular, e.g. elliptical, cross-section and more preferably are disposed with the long axis thereof radially directed. It will be appreciated that to maintain the balance of the rotor, the tubes are preferably symmetrically distributed about the axis thereof. Typically, about 10–30 tubes, e.g. 25, are used.

The elliptical shape affords the advantage that it presents a large area (for heat transfer) to a fluid providing low-grade heat without unduly restricting the passage of that fluid between the tubes. Furthermore, it presents a large area for the LVC to flow over as a thin highly sheared film, and the surface wettability is surprisingly substantially improved compared with a circular tube, especially when the inside surface has been roughened by suitable means e.g. grit-blasting.

LVC is charged to the tubes by suitable means. For example, LVC may be sprayed onto the radially inner zone of the inner surface of the tubes from orifices in a pipe which is disposed within, the ellipse. A small portion of the LVC may undergo flash vaporization, the rest forms a thin film on the inner surface under centrifugal force. The rate at which liquid is charged to the tubes is typically greater than the rate at which it can evaporate therefrom and consequently substantially all the inner surface of each tube is continuously wet. A minor portion of the film evaporates from the aforesaid inner surface of the tube and a major portion typically overflows to the periphery of the evaporator disc.

The aforesaid major unevaporated portion flows radially outwards where it is collected adjacent the rim of the evaporator disc and recirculated by suitable means, e.g. a trough, scoop and distribution header, to the ellipses.

Preferably, LVC adjacent the rim of the evaporator (fresh from the condenser and/or to be recirculated) is projected radially inwards as a liquid jet by a stationary scoop and collected by a distributor rotating with the evaporator which turns the jet and projects a spray towards the inside of the aforementioned elliptical evaporator tubes. This method tends to (a) eliminate small orifices in the aforementioned tubes in the distribution system and (b) provide a better spray pattern such that flash vaporization is promoted. Such a distribution system tends to be simpler to manufacture than the aforementioned alternative.

According to a further aspect of the present invention there is provided a distributor for distributing a liquid to a plurality of receivers which are mounted for rotation about an axis parallel thereto characterized in that:

(a) the distributor is rotatable with the plurality of receivers
(b) the distributor is provided with a plurality of ports in a plane transverse to the axis of rotation each of which ports converges to an apex distant the perimeter of the distributor and the apex trails the line from the leading edge to the axis; and
(c) at the apex of each port is an orifice providing fluid flow communication with the receiver The tubes of the evaporator are preferably provided with a plurality of fins, more preferably transverse thereto, to aid heat transfer from the low temperature source of heat to the inner surface of the tubes. Where such fins are present, the plurality of tubes act as a fan impeller such that as they rotate with the rotor they induce a flow of the low temperature source of heat thereover to facilitate evaporation of the LVC from the evaporator.

Further, we have found surprisingly that evaporation of the LVC from the evaporator can be effected at a suitable rate down to a temperature of about −5° C.

Preferably the heat-accepting fluid is introduced to, and extracted from, the heat-pump co-axially, particularly where the heat-accepting fluid flows sequentially through the absorber and the condenser. More preferably the heat accepting fluid is both introduced to, and extracted from the heat pump at the same end, e.g. through a sheath/core arrangement of tubes. That arrangement has the benefits that:

(i) access for the pipework conveying the heat-accepting fluid to and from the heat pump can be disposed at one end there;
(ii) only one seal between that fluid and the exterior, is needed;
(iii) the shaft on which the stationary pumps are mounted in the area between Components C and D can be of a smaller diameter reducing (a) the size of bearings and seals which have to be provided therefor, and (b) the potential area for leakage of Mixture R before it reaches the pipe through which it is transferred to the generator;
(iv) a smaller bearing and shaft can be provided to support the rotor outboard of the evaporator since the heat-accepting fluid does not necessarily have to pass through the center of the portion of the shaft which is exterior the evaporator.

A small hole or tube is often provided, adjacent the condenser and/or absorber, for fluid flow connection between the entry and exit pipes for the heat-accepting fluid. Such a hole or tube allows air transfer, e.g. by bleeding, such that the generation of an air-block, e.g. at the condenser/absorber, tends to be prevented.

According to a more specific aspect of the present invention there is provided a centrifugal absorption-cycle heat pump which comprises at least the following components:

(A) a vapor generator, mounted upon a rotary shaft for rotation therewith and comprising at least one disc or plate a first face of which accepts high grade heat obtained on combustion of a fossil fuel and across the second face of which Mixture R flows such that vapor of at least a portion of the volatile component thereof is generated from Mixture R and Mixture L is discharged from the second face at a zone at, or near the perimeter thereof;

(B) a condenser mounted upon said rotary shaft for rotation therewith and comprising one disc across a first face of which VVC generated in the vapor generator flows and condenses thereon and across the second face of which a heat-accepting liquid flows such that heat of condensation is transferred thereto;

(C) an evaporator mounted upon said shaft for rotation therewith through which the LVC from the condenser flows and from which it evaporates by heat transfer from a low grade heat source;

(D) an absorber mounted upon said rotary shaft for rotation therewith and comprising at least one disc across a first face of which the VVC from the evaporator and Mixture L from the vapor generator together flow and across the second face of which the heat-accepting liquid flows such that the heat of absorption is transferred thereto before it flows to the condenser; and (E) a solution heat exchanger in which heat is exchanged between Mixtures R and L;

the said heat transfer in each of components A, B and D occurs through the thickness of a disc therein from a first face to the second face of the disc; characterized in that the evaporator comprises a plurality of tubes which are (a) dependent from, and rotatable with, a disc or plate such that they project away from Component D;
(b) disposed substantially parallel to the axis of rotation and adjacent the perimeter of the disc or plate;
(c) chargeable with LVC which flows as a film over the inner surface thereof;
(d) contactable with low-grade heat which flows over the outer surface thereof such that at least a portion of the LVC evaporates from the inner surface.

Whereas we do not exclude the possibility that the vapor generator and/or the evaporator may comprise substantially planar discs, preferably both the generator and the evaporator are dished such that they are able to withstand pressure stresses to which they may be subjected in use. Preferably at least the generator or evaporator, more preferably the generator, is inwardly concave to reduce the overall length of the machine, thus tending to make it more compact.

The condenser and absorber are constructed such that heat transfer to the heat-accepting fluid flowing over a face thereof is facilitated. For example, they may comprise means for improving heat transfer by increasing the heat-transfer area and facilitating laminar flow. As examples of such means may be mentioned inter alia provision of Expamet, ribbed metal or metal gauze attached to or in contact with the second face of the condenser or absorber disc. It will be appreciated that provision of such means tends to produce a strong assembly which is capable of resisting the forces to which it is subjected by both rotation and the static pressure of the heat-accepting medium.

Preferably, the rotary assembly is of generally frusto-conical form with the generator at the smaller diameter end thereof.

The frusto-conical shape of the rotary assembly is chosen such that:

(i) it assists the flow of Mixture L from the vapor generator through the heat exchanger to a trough (from which it is charged to the absorber) due to the static pressure head difference between the perimeter of the generator and the aforesaid trough, which difference is magnified many times (say 50 to 60) by centrifugal force. This, together with the pressure differential betWeen Components A/B and Components C/D is sufficient to allow at least substantially all of Mixture L to return to the trough without the need to develop a head of liquid adjacent the perimeter of the generator;

(ii) it increases the distance between the ports through which LVC leaves the condenser and Mixture L leaves the generator, which increases the length of any path along which heat may leak from the hot generator to the cooler. Areas of the heat pump so reducing the heat losses and thus the inefficiencies of the cycle;

(iii) it similarly increases the distance and the length of any path along which heat may leak from the troughs for the Mixtures R and L in the absorber region and LVC in the evaporator, so reducing inefficiency further; and (iv) it facilitates control of the level of Mixture R in the appropriate trough in the absorber.

For example, overflow holes may be provided in the side walls of the aforesaid trough 33, which allow Mixture R to pass under centrifugal acceleration into a suitably disposed reservoir, and discharge slowly through further holes into a further trough.

The heat pump according to the present invention is preferably provided with suitable control means, e.g. a microprocessor, for reversing the direction of rotation of the rotary assembly for a short time, e.g. for a few revolutions, immediately prior to switch off. Such reversal of the direction of rotation inter-mixes Mixtures L and R such that the working mixture is restored to a liquid state which may be suitable for storage at low temperature.

The rotor of the heat pump according to the present invention is typically rotated such that the rotor tip speed is about 5-20, e.g. about 12, m/sec.

In our aforesaid EP 0,119,776B there is described a solution heat exchanger wherein heat transfer between Mixtures R and L occurs. That heat exchanger comprises a plurality of discs, e.g. suitably embossed, at a spacing of about 1 mm. We have now found that the heat exchanger is preferably in the form of one or more annular components mounted on the outer region of the rotor for rotation therewith. However, we do not exclude the possibility that the aforesaid heat exchange may be effected in a plurality of discrete heat exchangers mounted on the rotor, although this is not preferred.

Preferably the solution heat exchanger is formed from foil, for example of stainless steel, and the foil is adapted and arranged in the form of at least concentric cylindrical portions coaxial with the rotor and provided with manifolds such that Mixtures R and L flow, substantially by laminar flow, through alternate layers as in the manner of a counter-flow heat exchanger, through a matrix of closely spaced plates.

In a preferred method of construction, the solution heat exchanger is prepared in a multiple sandwich form. Each layer comprises (i) a plain (or flat) plate with fluid transfer holes in both ends, (ii) a frame with a suitable port and (iii) heat transferring means as hereinbefore described, e.g. Expamet, etc. These layers may be joined together into a robust, rigid, leaktight assembly by suitable means, e.g. vacuum brazing, diffusion bonding or welding. The frame is preferably designed so that only one type is required, it being used either side up alternately. This provides simple and effective manifolding of the two fluid streams.

According to yet another aspect of the present invention there is provided a solution heat exchanger in the form of a concentric multiple sandwich each layer of which comprises
(a) a flat plate with fluid transfer holes both end;
(b) a frame with a suitable port;
(c) heat transferring means, e.g. Expamet, ribbed; metal or metal gauze;
(d) means to charge hot and cold liquids separately thereto; and
(e) means to discharge discrete liquids therefrom.

In the heat exchangers in known absorption cycle heat pumps, it is often difficult to force Mixture R therethrough because of the pressure differential which exists between the generator/condenser and the evaporator/absorber regions of the heat pump.

Where (1) the working mixture comprises water and alkali metal compounds as hereinbefore described, and (2) the low grade heat at the evaporator is at about 0° C. and the LVC at the condenser is at about 60° C. we have found surprisingly that the pumping of Mixture R from the absorber to the generator via the heat exchanger can be effected on a so-called rotodynamic principle. e.g. immersing a stationary scoop into a rotating annular pool of a liquid, i.e. Mixture R. For example, suitably disposed and directed scoops, acting in the manner of "pitot" pumps, restrained by gravity or magnetism (preferably provided with integral splash shields) can be used to force Mixture R through the heat exchanger, and also overcome the pressure differential between the generator and the evaporator. Such scoops are disposed within the hermetic shell and are held stationary by preferably gravitational or magnetic means.

It will be appreciated that to improve the wettability of the appropriate generator and absorber surfaces with Mixture R and Mixture L respectively, such surfaces are preferably subjected to a suitable treatment, e.g. grit-, sand-blasting or metal spraying. Such treatment often has the further advantage that it increases the surface area, and improves heat transfer.

It will be appreciated that to at least reduce detrimental splashing between the absorber and the evaporator, and vice versa, a means to reduce such splashing, e.g. a baffle, may be disposed intermediate the absorber and the evaporator which should not unduly inhibit low-pressure vapor flow (e.g. 50 in FIG. 4).

The heat pump is preferably provided with a U-tube expansion device for throttling the LVC as it flows from the condenser to the evaporator. Typically this is in the form of a plain tube without restrictions through which the liquid flows. The tube maintains the pressure difference manometrically with a liquid lock. More preferably, the U-tube is disposed adjacent the periphery of the rotary assembly and the arms of the U are radially directed.

The inner surface of the wall of the rotor is provided with a plurality of circumferential troughs. Discrete troughs, which are chargeable with appropriate liquids, are preferably thermally insulated from one another.

Means to charge fluids to and discharge fluids from the components of heat pumps according to the present invention are provided at appropriate positions thereon. For example, stationary scoops may be used to control fluid flow through the heat pump. Thus, a scoop which is submerged in Mixture R in a trough on the rotor wall adjacent the perimeter of Component D may control the flow of Mixture R through the system. A second scoop, e.g. 34a in FIG. 2, disposed adjacent the aforesaid scoop but radially inward thereof may be used to discharge excess Mixture R to a reservoir to limit unnecessary drag on the pump. A second partially submerged scoop in the appropriate trough (e.g. 21 in 20 in FIG. 2) captures substantially all the Mixture L entering that trough and distributes it over the absorber face via a stationary pipe arranged essentially tangential to that plate.

Furthermore, we have now found that scoops facing in a reverse direction can be mounted on the aforementioned pumps to effect alternative flow regimes when the machine rotation is reversed. This may be used, for example, to provide a re-mixing of the discrete Mixtures R and L and LVC shortly before shut-down.

Drive means to rotate the rotary shaft in heat pumps according to the present invention are conveniently electric motors, with optionally speed control to enable parasitic electrical energy to be minimized.

The rotor in the heat pump according to the present invention typically has an axial length of between 20 and 80 cms, e.g. about 35 cms and a diameter of between 10 and 100 cms, e.g. about 50 cms.

The present invention is further illustrated by reference to the accompanying drawing in which:

FIG. 4 illustrates a preferred embodiment of the heat pump according to the present invention; and FIGS. 5, 6 and 7 are views of a pumping arrangement suitable for use in the embodiments of FIGS. 2 and 4, the views being taken in the axial direction (looking from right to left in FIG. 4) and from diametrically-opposite sides of the rotary assembly.

Figure 1:
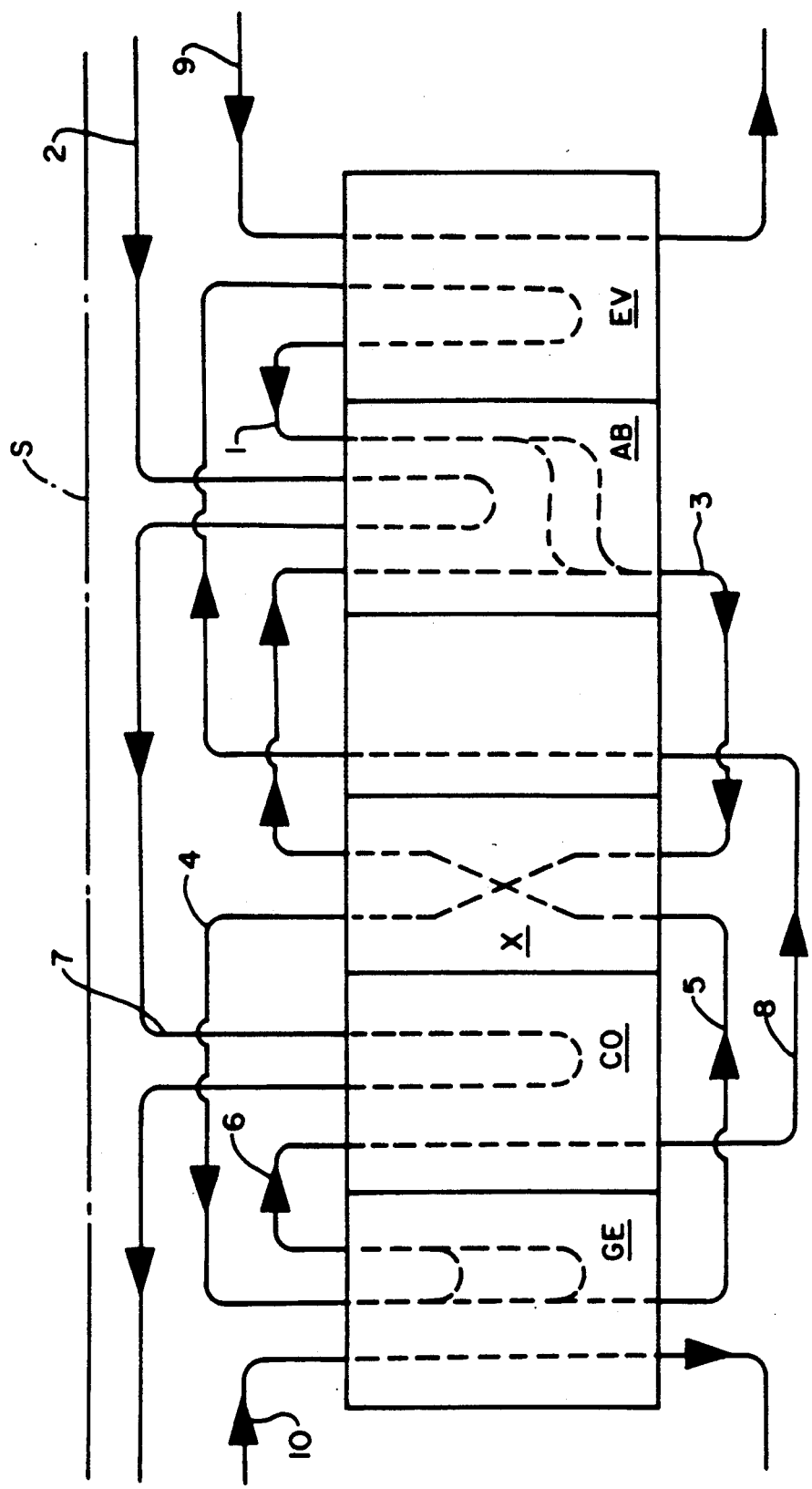
FIG. 1 illustrates in simple schematic manner the components, and the juxtaposition thereof, of an absorption cycle heat pump according to the present invention and the fluid flow therethrough.

Referring firstly to FIG. 1, an aqueous working mixture is circulated around a hermetically sealed system consisting of an evaporator EV an absorber AB a solution heat exchanger X, a vapor generator GE and a condenser CO in that sequence upon a shaft at S, for rotation therewith. In the evaporator EV, water (the volatile component) is vaporized by heat exchange with a flow of ambient air (or with some alternative ambient source of heat, such as water or the ground). The vapor passes via line 1 to the absorber AB in which it is absorbed into a water-lean mixture of water and alkali metal hydroxides (Mixture L), yielding up its heat of solution in doing so. The heat is taken up by heat transfer into a stream of a medium to be heated, typically a central heating medium, e.g. water or air, flowing in line 2.

The water-rich mixture of water and alkali metal hydroxides emerging from the absorber AB (Mixture R), (which typically comprises about 67% w/w caesium hydroxide, about 10% w/w potassium hydroxide and about 23% w/w water) passes via the line 3 to the solution heat exchanger X wherein it takes up heat from the aforesaid Mixture L before flowing via the line 4 to the vapor generator GE. The generator GE is heated, for example by radiant heat, or directly by gas flame or indirectly with hot gas; steam (VVC) is evolved from Mixture R. The resulting Mixture L is returned via the line 5, and the solution heat exchanger X to the absorber AB.

Vapor from the generator GE is conveyed by the line 6 to the condenser CO in which it loses heat to medium to be heated flowing in line 7 and is condensed to liquid. The liquid is finally returned to the evaporator EV via line 8.

As will be readily apparent, the total heat input to the heat pump is the sum of the low grade heat taken from the ambient fluid at the evaporator EV and the high grade heat supplied to the vapor generator GE. The heat output, which is at a temperature intermediate between that at the evaporator and that at the generator, is that taken up by the medium to be heated in the absorber AB and the condenser CO.

The line 9 in FIG. 1 is the route by which ambient air is introduced to the evaporator. Hot gas from a suitable burner (where convection heating is employed) is introduced to the vapor generator by means of line 10. The medium to be heated, which flows through line 2 and then line 7, absorbs heat in the absorber and then in the condenser.

Figure 2:
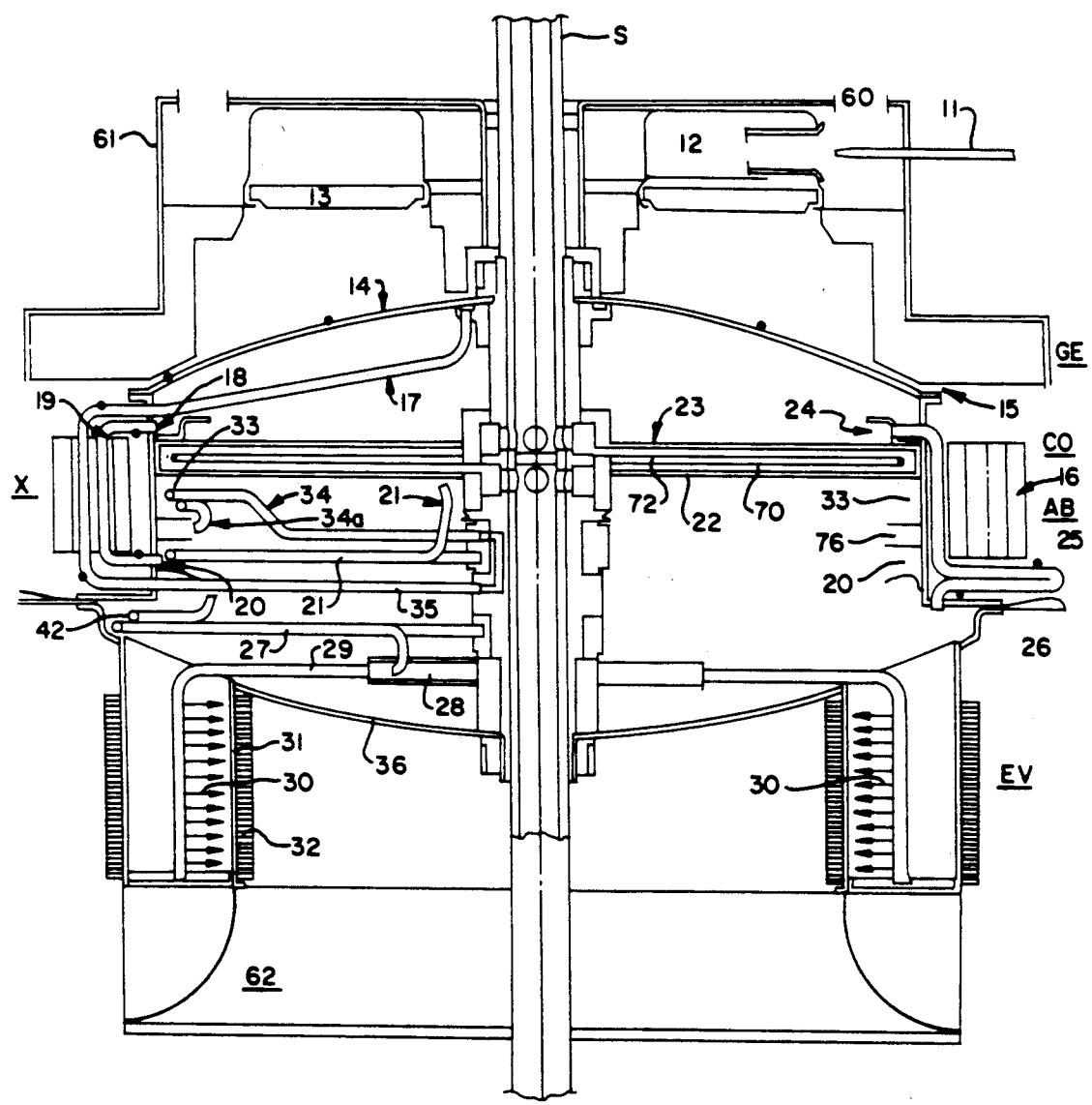
FIG. 2 is a sectional schematic view of a heat pump according to the present invention.

The embodiment of the heat pump according to the present invention illustrated schematically in FIG. 2 comprises the components of FIG. 1 mounted in the illustrated sequence upon a shaft at S, for rotation therewith. For ease of understanding, those portions of the heat pump rotor which perform functions already mentioned in connection with FIG. 1 namely the vapor generator, condenser, solution heat exchanger, absorber and evaporator, are indicated by the letters GE, CO, X, AB and EV respectively.

Gas, fed via pipe 11, is burnt in burner 12 with air which is drawn in through ports 60 in the housing 61; the burner is fitted with radiant plaques 13 which emit the energy of the combustion in approximately equal amounts of radiant heat and heat contained in the combustion products. The heat energy emitted from the stationary plaques 13 impinges on the rotary dished plate of generator 14. Hot flue gas from the burner 12 flows over the outer surface of generator 14; it is then expelled via annular slot 15 and loses further amounts of heat to the solution heat exchanger 16 as it flows thereover. In the region of slot 15, heat transfer to the generator plate 14 is primarily by forced convection.

Mixture R is charged to the inner surface of dished plate 14 via pipe 17, it absorbs heat therefrom such that VVC is generated as it flows radially outwards over the surface of 14 and Mixture L is expelled via port 18. From port 18, Mixture L flows in the pipe 19 to the channel 20 via solution heat exchanger 16 which is located radially outboard of the rotary assembly and is constructed as described hereinbefore. From channel 20, Mixture L is scooped via stationary pipe 21 and is charged to the surface 22 of the absorber disc adjacent the axis thereof.

VVC generated at the inner surface of dished plate 14 is condensed on surface 23 of the condenser disc. LVC flows radially outwards across the surface 23 and collects in trough 24. It flows from trough 24 into U-tube 25 which acts as a throttle and thence into trough 26. From trough 26 it is scooped by stationary pipe 27 and fed into rotating header ring 28. From header ring 28, it flows through pipes 29 and is sprayed radially inwardly therefrom (see arrows 30) via orifices into elliptical tubes 31 which are dependent from dished plate 36 and which are provided with fins 32 transverse thereto. A portion of the LVC evaporates from the inner surface of tubes 31 to form VVC. Unvaporized volatile component overflows from the tube 31 to the channel 26 and hence is recycled to the tubes 31 via 27, 28 and 29.

Ambient air is drawn, e.g. at about 1 m$^3$/sec, through the shroud 62, it donates heat to the fins 32 and tubes 31 of the evaporator and is then expelled radially outwards.

VVC formed in the evaporator flows to the surface of the absorber where it is absorbed in Mixture L with the formation of Mixture R. Mixture R flows radially outwards to the channel 33 where it is scooped by stationary pipe 34 and flows via pipe 35 through the solution heat exchanger 16 to pipe 17 and hence the cycle is completed.

A stationary skimming pipe 34a is associated with the channel 33 in order to control the level of liquid in channel 33. The pipe 34a runs partially submerged in the liquid and feeds any excess into an adjacent channel 76. The channels 33 and 76 are interconnected by a small hole or holes to bleed water-rich absorbent back to channel 33. Similarly, a scoop pipe 42 is associated with the channel 26 to control the liquid level therein, the scoop pipe 42 running partially submerged and directing excess liquid in channel 26 into for example channel 20.

The various scoop pipes 21, 27, 34, 34a, 42 all have their inlets directed in the direction opposite to the direction of the rotation of the rotary assembly, and hence the direction of motion of the liquid, and they are all restrained against rotation by torque-reaction means which may be magnetic or may be in the form of a weight (not shown in FIG. 2) freely mounted on the shaft S so that the weight remains substantially stationary as the rotary assembly rotates.

The rotary assembly comprising the vapor generator, the condenser, the absorber and the evaporator is driven by drive means not shown, mounted on the hollow shaft S at the generator end of the shaft, the absorber end of the shaft is mounted in suitable bearings. Water, the heat-accepting fluid, flows through the shaft S from the evaporator end, radially outward through the absorber in contact with disc 22, radially inWard through the condenser in contact with disc 23 and is expelled from the shaft adjacent the generator end thereof. It will be seen that the absorber disc 22 and the condenser disc 23 bound a chamber 70 which forms a heat exchanger common to the condenser and the absorber thereby avoiding the need for separate heat exchangers. A partition 72 separates the chamber 70 into two radially and circumferentially extending zones comprising a gap between the absorber disc 22 and the partition 72 and a gap between the condenser disc 23 and the partition 72, the two zones being in communication at the periphery of the partition 72.

Figure 3B:
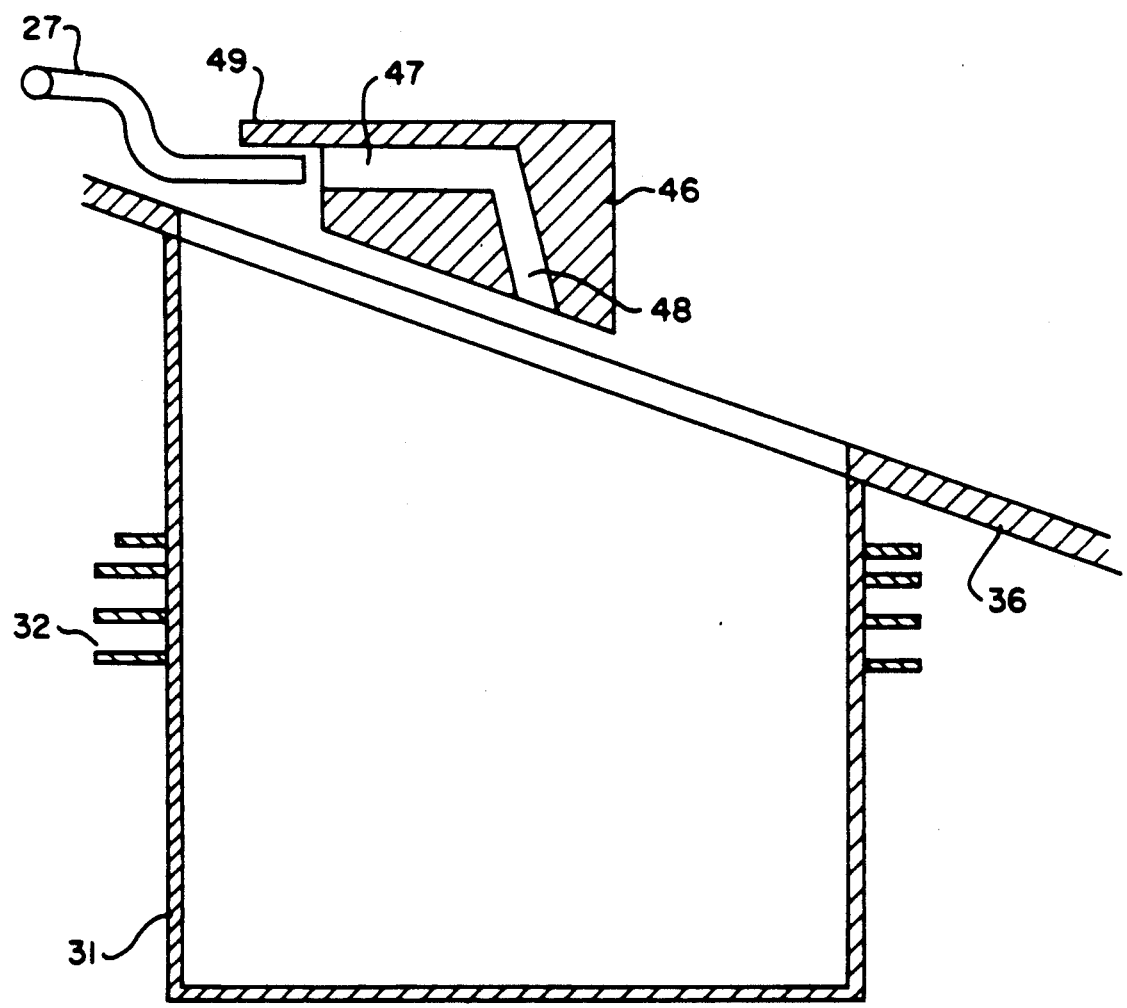
FIG. 3 is a schematic view, partly in section and to a different scale, of a segment of a liquid distributor for use in the evaporator of the heat pump according to the present invention; (a) in a plane transverse to the axis of rotation; and (b) in a plane parallel to the axis of rotation.

Referring now to FIG. 3 (a and b) showing a modified mechanism for introducing LVC into the tubes 31, the stationary scoop pipe 27 is adapted to discharge a jet of LVC radially into channels 47 in a distributor mounted on and rotatable with the evaporator, each in turn as they pass the jet. The LVC jet is gathered by the radial convergence of channels 47 and, because of the relative motion of the distributor 46 to the jet, it is forced through orifice 48. The size of orifice 48 and the alignment thereof are arranged such that the jet emerging therefrom is divergent and is projected with radially inwardly- and axially- directed components of motion such that substantially the whole of the radially inner surface of the tube 31 is wetted. The liquid coats the walls under centrifugal force wetting the remainder of the inner surface of the tube 31. A splash shield 49 prevents any LVC which re-emerges from 47 from entering the absorber section of the machine and directs it back into trough 26.

Referring now to FIG. 4, the preferred embodiment of the heat pump according to the present invention illustrated schematically therein comprises the components of FIGS. 1 and 2 mounted in the illustrated sequence upon a shaft at S, for rotation therewith.

For ease of understanding, those portions of the heat pump rotor which perform functions already mentioned in connection with FIG. 2 are indicated by the same numerals, e.g. dished generator disc 14. Gas, fed via pipe 11, is burnt in burner 12 which is fitted with radiant plaques 13. Radiant heat and combustion products from the plaques 13 impinge on the inwardly concave dished plate of generator 14. Hot flue gas from the burner 12 flows over the outer surface of generator 14, it is then expelled via annular slot 15 and loses further amounts of heat to the solution heat exchanger 16 and to fins 45 as it flows thereover, the housing 61 being shaped to direct the flue gas in an axial direction so as to pass over the heat exchanger 16.

Mixture R is charged to the inner surface of concavely dished plate 14 via pipe 17 where it absorbs heat such that VVC is generated as it flows radially outwards over the surface of plate 14 and Mixture L is expelled via port 18. From port 18, Mixture L flows in the pipe 19 through solution heat exchanger 16 and then into the channel 20. From 20, Mixture L is scooped via partially submerged stationary pipe 21 and is charged to the surface 22 of the absorber disc adjacent the axis thereof via pipe 21a.

VVC generated at the inner surface of dished plate 14 is condensed on surface 23 of the condensing disc. LVC flows radially outwards across the surface 23 and collects in trough 24. It flows from trough 24 into U-tube throttle 25 and thence into trough 26. From trough 26 it is scooped by stationary pipe 27 and charged via the distributor illustrated in FIG. 3a, b to the tubes 31.

The scoop pipe 27 operates fully submerged with the liquid level in trough 26 being controlled by a second partially submerged pipe 42 sited adjacent to it with its inlet located radially inwardly of the inlet of pipe 27; pipe 42 lifts surplus LVC and discharges it in an axial jet into the absorber region e.g. towards the absorber disc 22 as shown or into the channel 33. That arrangement tends to afford a means whereby the system may be primed and achieve optimal running concentrations over a range of operating conditions.

VVC formed in the evaporator flows to the surface of the absorber where it is absorbed in Mixture L with the formation of Mixture R. Mixture R flows radially outwards to the channel 33 where it is scooped by stationary pipe 34 and flows via pipe 35 through the radially outboard solution heat exchanger 16 to pipe 17 and hence the cycle is completed.

The various scoop pipes 21, 27, 34, 42 are carried by or embodied in a structure 80 pivotally mounted on the narrower section 82 of the shaft. The structure 80 extends radially in the manner of a pendulum and comprises axially spaced legs 84, 86 between which the baffle 50 extends. Although described herein as pipes, the scoop pipes 21, 27, 34 and 42 may at least in part comprise drillings formed in the structure 80. The structure 80 constitutes an eccentrically-located weight and is designed to provide a torque reaction so that, during normal rotation of the rotary assembly, it remains stationary and thereby maintains the scoop pipes stationary.

In the embodiment of FIG. 4, the vapor generator wall 14 and the evaporator 36 form part of a generally frusto-conical housing with the generator wall 14 disposed at the small diameter end. The frusto-conical configuration enables the various peripheral reservoirs, i.e. channels 18, 24, 33, 20 and 26 to be readily located at differing radial distances with respect to the axis of the shaft 5 with the advantages previously described. The generator and evaporator walls 14 and 36 are both of concavo-convex configuration, the wall 14 being inwardly convex and the wall 36 being outwardly convex. This arrangement facilitates a more axially compact overall structure. The drive means D for example may be connected to the shaft S at a position where it is at least partly within the confines of the region encircled by the evaporator tubes.

The rotary assembly is driven by the drive means D, located at the evaporator end of the shaft S, the other end of the shaft being mounted in bearings 51. The shaft S comprises (a) a solid cylinder external to the evaporator; (b) the narrower diameter solid cylinder 82 intermediate the evaporator and the absorber on which the structure 80 carrying the scoop pipes is mounted; and (c) concentric inlet and outlet tubes 88, 90 from outside the vapor generator to the absorber/condenser. Water, the heat-accepting fluid, flows (a) from the generator end through the inlet tube 88, (b) radially outwards through the annular gap between the partition 72 and the absorber disc 22, (c) radially inwards through the annular gap between the partition 72 and the condenser disc 23; (d) through the tube 90 past the burner and is expelled from the rotor via appropriate seals.

A baffle 50 is disposed intermediate the absorber and the evaporator to reduce undesirable splashing of LVC occurring therebetween.

Figure 6:
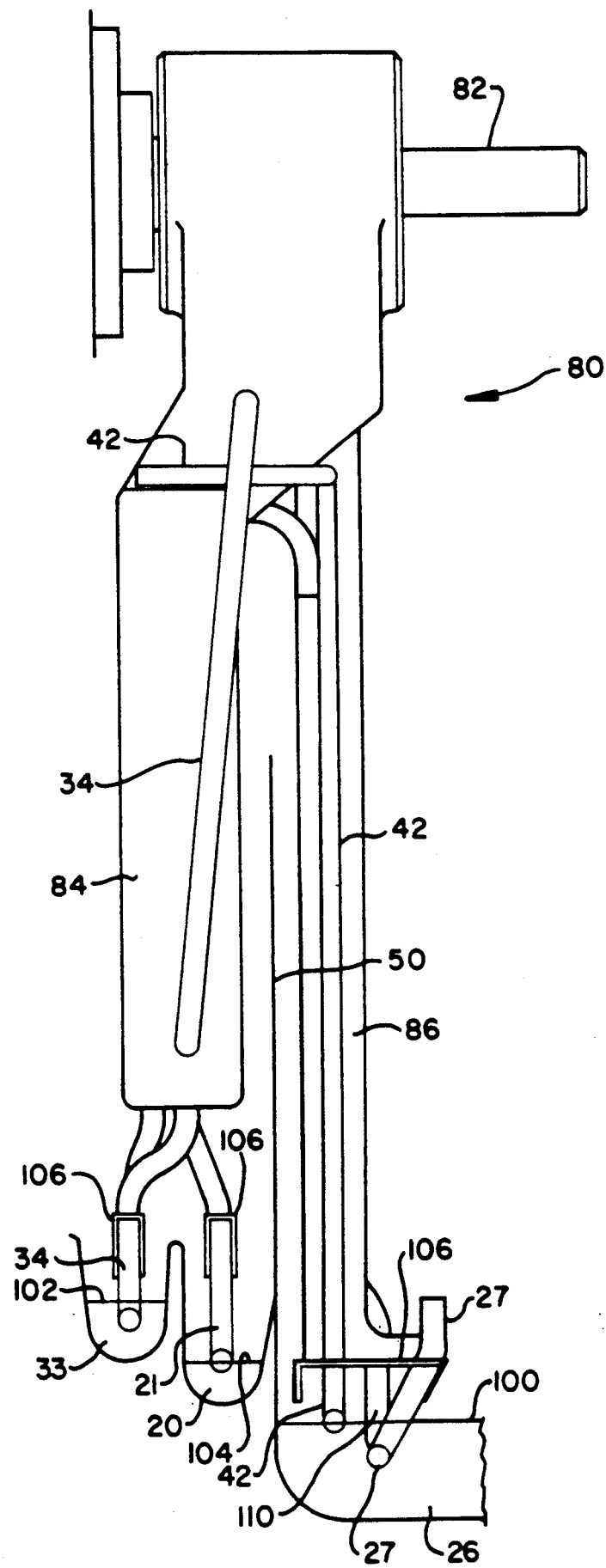

Referring to FIGS. 5, 6 and 7 which show one form of the pumping arrangement in more detail, the same reference numerals are used as in FIG. 4 to identify like parts. Thus, pipe 27 feeds LVC from reservoir 26 to the distributor 46 (not shown) and has its inlet submerged below the liquid level 100 within the reservoir 26. Skimming pipe 42 operates partially submerged during normal operation of the heat pump and feeds excess LVC into the absorber region. Pipe 34 operates submerged in the channel 33, i.e. below liquid level 102 and feeds water-rich absorbent to the vapor generator via drilling 105, pipe 35 (not shown), the solution heat exchanger 16 and the pipe 17. Pipe 21 operates partially submerged in channel 20 (the liquid level being indicated at 104) which receives Mixture L from the vapor generator. Pipe 21 feeds Mixture L onto the absorber disc 22 via drilling 108 and outlet 21a (not shown in full in FIG. 7). The various pipes are provided with splash guards 106. The channel 33 is provided with a further stationary pipe (not shown) forming part of the structure which operates partially submerged to determine the liquid level 102 in channel 33 by feeding liquid to for example a liquid reservoir (not shown) mounted on the structure 80.

The various pipes thus far described all have their inlets extending in the same circumferential direction, i.e. in the direction opposite to the rotational sense of the rotary assembly during normal operation of the pump. In addition to these pipes, there are pipes whose inlets project circumferentially in the opposite-direction and which are not therefore functional during normal operation of the heat pump. However, when the heat pump is to be switched off, as mentioned previously it is driven automatically under micro-processor control in the opposite-direction and in these circumstances, the normally non-functional pipes become effective to redistribute and remix the fluids, e.g. to restore the working fluid to a liquid state suitable for storage as a liquid at temperatures where the LVC may otherwise tend to freeze. Thus, for example, pipe 110, in the reverse mode of operation, feeds fluid which initially at switch-off is primarily LVC into the absorber region, via outlet 112, where remixing with the caustic absorber takes place. Similarly, pipe 114 in the reverse mode feeds liquid for the channel 33 via outlet 116 into the evaporator region.

The present invention is further illustrated by reference to the following Example.

EXAMPLE

The performance of a heat pump as described in FIG. 4 using water as the volatile component is described.
Mixture R had the following composition:

|  | % W/W |
|---|---|
| CsOH | 28.8 |
| KOH | 27.6 |
| NaOH | 19.2 |
| H$_2$O | 24.4 |

In the heat pump, wherein the high-grade heat is supplied by burning methane with air; the low-grade heat (ambient air) is at 5° C.; the heat accepting fluid is water which enters at about 55° C., runs sequentially through the evaporator and condenser, and is expelled at about 65° C.: it can be calculated that:

| Heat input to generator (from high grade heat) | 6000 watts |
|---|---|
| Heat input to evaporator (from low grade heat) | 4000 watts |
| Heat accepted at condensor by water | 4600 watts |
| Heat accepted at absorber by water | 5400 watts |

| Coefficient of performance of cycle = | $\frac{4600 + 5400}{6000} = 1.67$ |
|---|---|
| Coefficient of performance of machine (predicted = 1.42 if the overall burner and flue gas heat recovery efficiency is 85%. | |

Although the invention is described in terms of an absorption-cycle heat pump, it will be appreciated that certain aspects thereof are readily applicable to other forms of rotating fluid-handling apparatus.

We claim:

1. An absorption-cycle heat pump comprising a rotary assembly including a vapor generator, a condenser, an evaporator and an absorber so interconnected as to provide cyclic fluid flow paths for a volatile fluid component and an absorbent liquid therefor, a reservoir being provided for receiving from the condenser volatile fluid component condensed thereby in use, and means being provided for directing said component from the reservoir to heat exchange surface means of the evaporator so that said volatile component flows across the heat exchange surface means in a generally radially outward direction, the reservoir receiving from the heat exchange surface means of the evaporator such volatile component as remains unvaporize after flowing radially outward across said heat exchange surface means whereby part of the volatile component fed to said heat exchange surface means from the reservoir is recirculated back to the reservoir by-passing the condenser.

2. A heat pump as claimed in claim 1 in which the reservoir is located adjacent to the radially outer periphery of the assembly and said directing means includes means restrained against rotation for feeding the volatile component radially inwardly from the reservoir and distributing means rotatable with the assembly for registering with the non-rotating feeding means and transferring the volatile component from the feeding means to different portions of the heat exchange surface means of the evaporator.

3. A heat pump as claimed in claim 2, said heat-exchange surface means being constituted by a plurality of tubes which are spaced angularly about the rotational axis of the assembly and said distributing means being arranged to inject said volatile component derived from said feeding means into the tubes with a radially-inwardly directed component of motion so that the volatile component initially impinges against the radially innermost portions of the internal tube surfaces.

4. A heat pump as claimed in claim 3 in which the distributing means is arranged to inject said volatile component into the tubes with an axially directed component of motion in addition to said radially-inwardly directed component of motion.

5. A heat pump as claimed in claim 3 in which the distributing means is arranged to inject the volatile component into each of said tubes as a divergent jet.

6. A heat pump as claimed in claim 1 including means for controlling the level of volatile component in the reservoir and diverting excess volatile component into the absorber region of the assembly when a pre-determined level within the reservoir is attained.

7. A heat pump as claimed in claim 1 in which said directing means supplies volatile component to the heat exchange surface means of the evaporator at a rate such that in the course of flowing across said heat exchange surface means a major proportion of the volatile component remains unvaporized.

8. A heat pump as claimed in claim 3 in which the injection rate of volatile component into the tubes is such that the internal heat exchange surfaces of the tubes are maintained continuously wetted.

9. An absorption-cycle heat pump comprising a rotary assembly including a vapor generator, a condenser, an evaporator and an absorber so interconnected as to provide cyclic fluid flow paths for a volatile fluid component and an absorbent liquid therefor, means for rotatably driving the rotary assembly, the driving means being selectively operable to drive the rotary assembly in one rotational sense corresponding to normal operation of the heat pump and in a second rotational sense, and means operational when the assembly is driven in said second rotational sense to combine the volatile component with absorbent liquid which is depleted in said volatile component.

10. A heat pump as claimed in claim 9 in which said driving means is operable automatically to drive the rotary assembly in said second sense in response to cessation of rotational drive in said one sense.

11. An absorption-cycle heat pump comprising a rotary assembly including a vapor generator, a condenser, an evaporator and an absorber so interconnected as to provide cyclic fluid flow paths for a volatile fluid component and an absorbent liquid therefor, and heat exchange means associated with the absorber and the condenser, the heat exchange means including a chamber bounded on one side by the absorber and on the opposite side by the condenser and means defining a fluid flow path for heat exchange fluid within the chamber such that the heat exchange fluid flows across the respective interfaces with the absorber and the condenser, said chamber comprising first and second axially spaced walls extending transversely of the rotational axis of said assembly and respectively constituting the absorber and the condenser, said fluid flow path-defining means including a partition located between and axially spaced from the first and second walls so as to define with the latter gaps extending radially of, and circumferentially about, said rotational axis, the gaps being in communication with each other at the outer periphery of the partition.

12. A heat pump as claimed in claim 11 including for the heat exchange fluid: a first inlet passage which extends axially through the vapor generator and opens into the gap between said partition and the absorber wall; and a second outlet passage which also extends axially through the vapor generator and opens into the gap between said partition and the condenser wall.

13. A heat pump as claimed in claim 12 in which said inlet and outlet passage are coaxial with said rotational axis, one being located within the other.

14. An absorption-cycle heat pump comprising a rotary assembly including a vapor generator, a condenser, an evaporator and an absorber so interconnected as to provide cyclic fluid flow paths for a volatile fluid component and an absorbent liquid therefor, the evaporator comprising a plurality of tubes disposed substantially parallel to the rotational axis of the assembly and arranged for heat exchange with an external heat exchange fluid, means being provided for directing the volatile fluid component into the evaporator tubes so that, in use, the volatile component initially contacts radially innermost internal surface portions of the tubes and then, under the influence of the forces generated during rotation of the assembly, flows around the internal tube surfaces towards the radially outer extremities of the internal tube surfaces.

15. A heat pump as claimed in claim 14 in which said evaporator tubes are of non-circular section in a plane transverse to the rotational axis of the assembly with the major axis of each tube extending generally radially of the rotational axis.

16. A heat pump as claimed in claim 14 in which the directing means is arranged to inject the volatile component into each tube with radially inwardly-directed and axially-directed components of motion.

17. A heat pump as claimed in claim 14 in which the directing means is arranged to inject the volatile component into each tube at a rate which is greater than the rate at which the volatile component can evaporate at the internal heat exchange surface of the tube, the arrangement being such that the unevaporated volatile component, under the influence of the forces generated during rotation of the assembly, flows from each tube into a reservoir associated with the evaporator and located radially outboard of the tubes, which reservoir also receives condensed volatile component from the condenser, the directing means being arranged to draw the volatile component from the reservoir for injection into the evaporator tubes.

18. An absorption-cycle heat pump comprising a rotary assembly including a vapor generator, a condenser, an evaporator and an absorber so interconnected as to provide cyclic fluid flow paths for a volatile fluid component and an absorbent liquid therefor, and means for heating a wall of the vapor generator which extends generally transversely of the rotational axis of the assembly, the heating means comprising combustible fluid-fired radiant plaque heating means disposed to direct combustion products and radiant heat towards the vapor generator wall.

19. A heat pump as claimed in claim 18 in which the vapor generator wall is of dished configuration and is concave in a direction towards the radiant plaque heating means.

20. A heat pump as claimed in claim 18 including solution heat exchanger means for effecting heat exchange between volatile component-rich absorbent liquid flowing from the absorber to the vapor generator and volatile component-lean absorbent liquid flowing from the vapor generator to the absorber, and means for directing the flow of gaseous products of combustion derived from the heating means over the solution heat exchanger means.

21. A heat pump as claimed in claim 20 in which the solution heat exchanger means is rotatable with and located radially outboard of the rotary assembly.

22. A heat pump as claimed in claim 19 in which the generator and evaporator walls form boundary walls of a housing which is of generally frusto-conical configuration, the generator wall being disposed at the smaller diameter end of the frusto-conical housing.

23. An absorption-cycle heat pump comprising a rotary assembly including a vapor generator, a condenser, an evaporator, and an absorber and a solution heat exchanger so interconnected as to provide cyclic fluid flow paths for a volatile fluid component and an absorbent liquid therefor, the vapor generator comprising a wall which is heated in use and extends generally transversely of the rotational axis of the assembly, means being provided for supplying via the solution heat exchanger liquid absorbent rich in said volatile component to the generator wall at a radially inboard location so that the liquid absorbent flows radially outwardly across the wall during rotation of the assembly with accompanying vaporization of the volatile component and depletion of the absorbent liquid, means for collecting the depleted absorbent liquid at a radially outboard location and directing the same to the absorber via the solution heat exchanger, the solution heat exchanger being located radially outboard of the generator and the absorber whereby the forces generated during rotation of the assembly are effective to force feed the depleted absorbent liquid from the evaporator to the absorber via the solution heat exchanger.

24. An absorption-cycle heat pump comprising a rotary assembly including a vapor generator, a condenser, an evaporator and an absorber so interconnected as to provide cyclic fluid flow paths for a volatile fluid component and an absorbent therefor, the rotary assembly including a lower pressure zone and a higher pressure zone, the fluid having rotational motion imparted thereto in response to rotation of the assembly, and means for pumping fluid from the lower pressure zone to the higher pressure zone, the fluid-pumping means comprising means mounted for rotation about the axis of the assembly but restrained against rotation with the assembly and arranged to divert fluid in the lower pressure zone radially inwardly and means rotatable with the assembly for conducting the so diverted fluid radially outwardly before discharging the same into the high pressure zone.

25. An absorption-cycle heat pump comprising a rotary assembly including a vapor generator, a condenser, an evaporator and an absorber so interconnected as to provide cyclic fluid flow paths for a volatile fluid component and an absorbent therefor, the rotary housing, in use, imparting rotational motion to the fluid when contained within the housing, the forces generated being effective to displace the fluid into a circumferentially extending channel within the housing, a fluid-feeding means being provided to divert fluid from the channel for supply to another location, the fluid-feeding means comprising rotationally-restrained means defining at least two passageways, each of which has an inlet opening into the channel and extends radially inwardly of the channel, the inlets being located at different radial positions within the channel whereby, in use, the passageway with the more inwardly-located inlet limits the radial depth to which fluid can accumulate within the channel while the passageway(s) with the more outwardly-located inlet(s) continue to feed fluid from the channel.

26. Apparatus as claimed in claim 25 in which said rotational restraint is provided by magnetic means.

27. Apparatus as claimed in claim 25 in which said rotational restraint is provided by an eccentrically-disposed weight.

28. A heat pump as claimed in claim 25 in which each of the absorber and the evaporator has a respective said channel and said fluid-feeding means associated therewith.

29. A heat pump as claimed in claim 25 in which said passageways are formed within a common structure which constitutes said rotationally restrained means, said common structure being pivotal about the rotational axis of the housing and being restrained against rotation by torque-reaction means.

30. An absorption-cycle heat pump comprising a rotary assembly including a vapor generator, a condenser, an evaporator and an absorber so interconnected as to provide cyclic fluid flow paths for a volatile fluid component and an absorbent therefor, the rotary assembly including a lower pressure zone and a higher pressure zone, the fluid having rotational motion imparted thereto in response to rotation of the assembly, and means for pumping fluid from the lower pressure zone to the higher pressure zone, the fluid-pumping means comprising rotationally restrained means defining a passage having a radially outwardly located inlet opening in a direction counter to the direction of rotational motion of the fluid in the lower pressure zone, said passage serving to supply fluid from the lower pressure zone to the discharge outlet opening into the high pressure zone, said passage extending radially inwardly from the inlet thereof and communicating, at a radially inboard location with a further passage which is rotatable with said assembly and which extends radially outwardly from said radially inboard location so that the fluid undergoes centrifugal acceleration before being discharged into the high pressure zone via said outlet.

* * * * *